US011494171B1

(12) United States Patent
Acharya et al.

(10) Patent No.: US 11,494,171 B1
(45) Date of Patent: Nov. 8, 2022

(54) DECENTRALIZED PLATFORM FOR DEPLOYING AI MODELS

(71) Applicants: Soubir Acharya, Pleasantville, NY (US); Mirza Nasir Hossain, Kolkata (IN); Parag Bhupatray Oza, Township of Washington, NJ (US)

(72) Inventors: Soubir Acharya, Pleasantville, NY (US); Mirza Nasir Hossain, Kolkata (IN); Parag Bhupatray Oza, Township of Washington, NJ (US)

( * ) Notice: Subject to any disclaimer, the term of this patent is extended or adjusted under 35 U.S.C. 154(b) by 0 days.

(21) Appl. No.: 17/398,713

(22) Filed: Aug. 10, 2021

(51) Int. Cl.
*G06F 8/60* (2018.01)
*H04L 9/08* (2006.01)
*G06F 11/36* (2006.01)
*G06F 16/23* (2019.01)
*G06N 20/00* (2019.01)
*G06F 21/57* (2013.01)
*H04L 9/00* (2022.01)

(52) U.S. Cl.
CPC ............ *G06F 8/60* (2013.01); *G06F 11/3688* (2013.01); *G06F 16/2379* (2019.01); *G06F 21/57* (2013.01); *G06N 20/00* (2019.01); *H04L 9/0861* (2013.01); *G06F 2221/033* (2013.01); *H04L 9/50* (2022.05)

(58) Field of Classification Search
CPC ........................................................ G06F 8/60
See application file for complete search history.

(56) References Cited

U.S. PATENT DOCUMENTS

| 10,715,329 | B1* | 7/2020 | Wellman | H04L 63/0861 |
|---|---|---|---|---|
| 10,958,784 | B1* | 3/2021 | Way | G06Q 20/401 |
| 2008/0016357 | A1* | 1/2008 | Suarez | H04L 63/0823 |
| | | | | 713/176 |
| 2017/0346637 | A1* | 11/2017 | Zhang | H04L 9/30 |
| 2019/0334716 | A1* | 10/2019 | Kocsis | H04L 9/321 |
| 2019/0342095 | A1* | 11/2019 | Simons | H04L 9/50 |
| 2019/0354723 | A1* | 11/2019 | Dassenno | H04L 9/3239 |
| 2022/0092346 | A1* | 3/2022 | Jones | G06K 9/6227 |
| 2022/0182231 | A1* | 6/2022 | Ponceleon | H04L 9/0891 |

\* cited by examiner

*Primary Examiner* — Jae U Jeon

(57) ABSTRACT

Embodiments of the present subject matter relate to implementation of a decentralized platform for deploying at least one AI (Artificial Intelligence) model. A SaaS interface is configured in a network for publishing the at least one AI model and a genesis block of a blockchain is created for the at least one AI model. Upon achieving a consensus amongst a plurality of validators in the network, the blockchain is updated and broadcasted to the network participants. Further, the at least one AI model is used as a Non Fungible Token (NFT) on the blockchain. A smart contract is generated based on a corresponding differential creativity score for the AI model The smart contract is subsequently used for creating a new block on the public blockchain.

38 Claims, 6 Drawing Sheets

DECENTRALIZED PLATFORM FOR DEPLOYING AI MODELS

TECHNICAL FIELD

The present subject matter in general relates to Software as a Service (SaaS) platforms and more particularly to systems and methods for providing decentralized SaaS platforms for deploying and scaling of AI (Artificial Intelligence) solutions.

BACKGROUND

Deployment of various AI software solutions requires platforms that are accountable, yet easily accessible to broader AI community via a secure network. Currently, AI solutions developers rely on platforms that are not accessible globally, lack trust and accountability, and cost artificially high and hard for non-experts.

Some AI solutions, such as AI CDNs (Content delivery Networks) are involved in creating resources on-the-fly as demand goes up and down both within local geographies as well as remote locations as the reaction to geo-specific user requests is highly desirable. A production AI network requires real-time responses no matter where the user is in the world. Therefore, there is required a global network platform that provides an autonomous, learned, anticipatory scaling without the AI solution builder being burdened with details, wherein the AI solution builder or provider would set budget guidelines, affinity, and additional custom constraints and simply focus on publishing newer models based on user feedback. A production AI network further needs resilience with 24/7 uptime with low latency. A global network accordingly needs to be resilient against issues such as hardware failures, provider withdrawals, and network outages. Most CDNs offer some of the above-mentioned functionalities but are either tied to a cloud service provider or some proprietary CDN-as-a-service company. Apart from being not truly open, these networks are not aligned to AI solution/model delivery. A truly AI global network to exist as a public good, is therefore necessary to enable sustainable AI innovations.

Expanding AI solutions to reach the widest possible audience at the lowest possible cost requires leveraging under-utilized specialized hardware and expanding to commodity hardware. Most production grade deployments require low latency and high-performance hardware to run on but a large class of models in pre-production or research phases can perform well on commodity hardware especially when deployed in a decentralized manner. Modern security implies robust testing, immutability, and auditability. Modern security also demands hardening.

Further, data privacy is an increasing concern for end users and regulators. Centralized data collection especially for AI is less desired in the current scenario. Regulators have various approaches which vary widely from Europe, North America, and Asia. Typically, data collected in most jurisdictions should remain and/or analyzed within the same jurisdiction. Additionally, with robots and TOT (Internet of Things) devices generating a ton of data, both high velocity and high-volume transferring data for centralized analysis is both cost prohibitive and an engineering challenge.

In view of the above, there is a well felt need for systems and methods that provide decentralized platforms for deploying and scaling of AI (Artificial Intelligence) solutions in a fast and cost-effective manner.

SUMMARY

In order to provide a holistic solution to the above-mentioned limitations, there is provided a Software-as-a-Service (SaaS) solution for testing and deploying AI models at a global scale without lock-in and without sacrificing security, control, or observability.

According to an embodiment of the present subject matter, there is provided a computer implemented method for providing a decentralized platform for deploying at least one AI (Artificial Intelligence) model, the method comprising: configuring in a network: a SaaS interface for publishing the at least one AI model received from at least one model publisher, and a decentralized model store for storing the at least one AI model; using a decentralized ledger to create a genesis block of a blockchain for the at least one AI model; broadcasting the genesis block to a plurality of model validators in the network, each of the plurality of model validators validating the genesis block based on one or more validation metrics and one or more permissible techniques; receiving, a validated endorsement with respect to the genesis block, from each of the plurality of model validators; identifying whether or not a consensus is achieved amongst the plurality of validators; updating the blockchain by adding a new block to the blockchain upon achieving a consensus; and broadcasting the updated blockchain in the network.

According to an embodiment of the present subject matter, one or more prescribed metrics are generated by the plurality of model validators during the validation process.

According to another embodiment of the present subject matter, the new block includes a model benchmark, the model benchmark producing a score that reflects quality of the consensus achieved.

According to yet another embodiment of the present subject matter, the blockchain for the at least one model remains unchanged if no consensus is achieved.

According to yet another embodiment of the present subject matter, the validation step is repeated if the at least one model publisher updates the at least one AI model.

According to yet another embodiment of the present subject matter, the validation step is repeated if any new model validator revalidates the at least one AI model.

According to yet another embodiment of the present subject matter, each of the plurality of validators receive a network token of a value if the consensus is reached.

According to yet another embodiment of the present subject matter, it is determined before publishing the at least one AI model, if the at least one AI model is different from or similar to an another at least one model already existing in the network.

According to yet another embodiment of the present subject matter, a model hash value, and a Uniform Resource Identifier (URI) are generated for the at least one AI model stored in the decentralized model store.

According to yet another embodiment of the present subject matter, the model hash value is a constituent to a Non Fungible Token (NFT) that uniquely identifies the at least one AI model for posterity immutably.

According to yet another embodiment of the present subject matter, the genesis block holds the model hash value along with the URI for enabling the plurality of validators to locate and download the at least one AI model from the decentralized model store.

According to yet another embodiment of the present subject matter, the at least one AI Model is published as a Non Fungible Token (NFTs) on a public blockchain for mining.

According to yet another embodiment, the present subject matter also provides a system for providing a decentralized platform for deploying at least one AI (Artificial Intelligence) model, the system comprising: a network configured to include: a SaaS interface configured to publish the at least one AI model received from at least one model publisher, and a decentralized model store configured to store the at least one AI model; the SaaS interface further configured to: use a decentralized ledger to create a genesis block of a blockchain for the at least one AI model; broadcast the genesis block to a plurality of model validators in the network, each of the plurality of model validators validating the genesis block based on one or more validation metrics and one or more permissible techniques; receive, a validated endorsement with respect to the genesis block, from each of the plurality of model validators; identify whether or not a consensus is achieved amongst the plurality of validators; update the blockchain by adding a new block to the blockchain upon achieving a consensus; broadcast the updated blockchain in the network.

According to yet another embodiment, the present subject matter also provides a computer implemented method for publishing at least one AI model as a Non Fungible Token (NFT) on a public blockchain, the method comprising: creating at least one encryption key for encrypting at least one artefact associated with the at least one AI model; storing the encrypted at least one artefact in a decentralized model store; generating an artefact hash value for the stored encrypted at least one artefact; generating a differential creativity score corresponding to the at least one AI model to be published; comparing the generated differential creativity score with a predefined threshold value; creating a smart contract if the differential creativity score is less than the predefined threshold value; and using the smart contract for creating a new block on the public blockchain.

According to yet another embodiment of the present subject matter, the at least one AI model is published as a Non Fungible Token (NFT) on a public blockchain further comprises: minting, using the smart contract, the artefact hash values as the NFTs, and minting, using the smart contract, one or more existing model benchmarks as Fungible Token (FTs); wherein a newly minted token is updated with metadata that points to a new URI separately generated to point to the network.

According to yet another embodiment of the present subject matter, the differential creativity score is used to determine, before publishing the at least one model, if the at least one model is different from or similar to an another at least one model already existing on the public blockchain.

According to yet another embodiment of the present subject matter, the differential creativity score is generated by: gathering lineage and benchmark information from the at least one AI model to be published; gathering all existing AI models already published, as NFTs on the public blockchain; creating a sub-graph of the at least one AI model to be published; creating an embedding for the at least one AI model; and determining a corresponding custom distance value for the at least one AI model with respect to the already existing AI models, to indicate how close is the at least one AI model to be published is from the existing AI models.

According to yet another embodiment of the present subject matter, the differential creativity score determines if the at least one AI model has to be published or is to be resent for validation.

According to yet another embodiment of the present subject matter, the computer implemented method for publishing at least one AI model as a Non Fungible Token (NFT) on a public blockchain further comprises: configuring in the network: a runtime compatibility testing module for converting the at least one AI model to a compatible format that can be run on one or more devices; an integration testing module for testing basic functionality of the at least one AI model; a behavioural testing module for testing robustness of the at least one AI model; and an adversarial testing module for testing security of the at least model against any adversarial attacks.

According to yet another embodiment of the present subject matter, at least one AI model is published as a Non Fungible Token (NFT) on a public blockchain.

According to yet another embodiment of the present subject matter, a secure runtime generation is provided by configuring a docker container in the network.

According to yet another embodiment, the present subject matter also provides a system for publishing at least one AI model as a Non Fungible Token (NFT) on a public blockchain. The system comprises: a network configured to include: a SaaS interface configured to publish the at least one AI model received from at least one model publisher, and a decentralized model store configured to store the at least one AI model; the SaaS interface further configured to: create at least one encryption key for encrypting at least one artefact associated with the at least one AI model; store the encrypted at least one artefact in the decentralized model store; generate an artefact hash value for the stored encrypted at least one artefact; generate a differential creativity score corresponding to the at least one AI model to be published; compare the generated differential creativity score with a predefined threshold value; create a smart contract if the differential creativity score is less than the predefined threshold value; use the smart contract for creating a new block on the public blockchain.

The afore-mentioned objectives and additional aspects of the embodiments herein will be better understood when read in conjunction with the following description and accompanying drawings. It should be understood, however, that the following descriptions, while indicating preferred embodiments and numerous specific details thereof, are given by way of illustration and not of limitation. This section is intended only to introduce certain objects and aspects of the present invention, and is therefore, not intended to define key features or scope of the subject matter of the present invention.

BRIEF DESCRIPTION OF THE DRAWINGS

The figures mentioned in this section are intended to disclose exemplary embodiments of the claimed system and method. Further, the components/modules and steps of a process are assigned reference numerals that are used throughout the description to indicate the respective components and steps. Other objects, features, and advantages of the present invention will be apparent from the following description when read with reference to the accompanying drawings.

DETAILED DESCRIPTION

Figure 1:
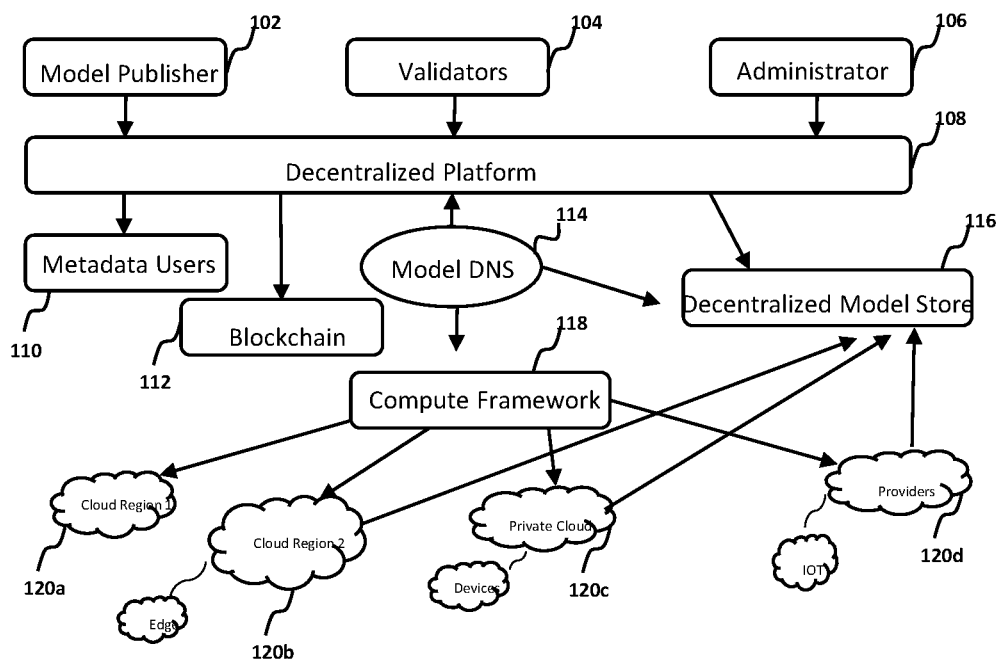
FIG. 1 is a block diagram of a system for providing a decentralized platform for deploying at least one AI (Artificial Intelligence) model, according to an exemplary embodiment of the present subject matter.

This section is intended to provide explanation and description of various possible embodiments of the present invention. The embodiments used herein, and various features and advantageous details thereof are explained more fully with reference to non-limiting embodiments illustrated in the accompanying drawings and detailed in the following description. The examples used herein are intended only to facilitate an understanding of ways in which the embodiments herein may be practiced and to further enable the person skilled in the art to practice the embodiments used herein. Also, the examples/embodiments described herein should not be construed as limiting the scope of the embodiments herein. Corresponding reference numerals indicate corresponding parts throughout the drawings.

The present subject matter relates to implementation of a decentralized platform for deploying at least one AI (Artificial Intelligence) model. A SaaS interface is configured in a network for publishing the at least one AI model. A genesis block of a blockchain is created for the at least one AI model, and verified by a plurality of validators in the network. Upon achieving a consensus amongst the plurality of validators, the blockchain is updated and subsequently broadcasted in the network. Further, the at least one AI model is used as a Non Fungible Token (NFT) on the blockchain, wherein at least one artefact associated with the at least one AI model is encrypted and stored. A smart contract is generated if a differential creativity score for the corresponding AI model is less than a predefined threshold value. The smart contract is subsequently used for creating a new block on the public blockchain.

As used herein, 'computer device' is a smart electronic device capable of communicating with various other electronic devices and applications via one or more communication networks. Examples of said user device include, but not limited to, a wireless communication device, a smart phone, a tablet, a desktop, a laptop, a computer system etcetera. The computer device may be used by model publishers, AI model creators, validators, AI practitioners etcetera. The computer device comprises: an input unit to receive one or more input data; an operating system to enable the computer device to operate; a processor to process various data and information; a memory unit to store initial data, intermediary data, and final data; and an output unit. The processor associated with the computer device is an intelligent device or module, that is specifically programmed to process digital logics and perform analytical skills for analysing and processing various data and metadata or information, according to the embodiments of the present invention. The processor may be programmed by using executable instructions stored in the memory.

As used herein, 'module' or 'unit' refers to a device, a system, a hardware, a computer application, a framework, configured to execute specific functions or instructions according to the embodiments of the present invention. The module or unit may include a single device or multiple devices configured to perform specific functions according to the present invention disclosed herein.

As used herein, 'blockchain' refers to a distributed ledger that facilitates in establishing and maintaining a continuously increasing records of secured data transactions. The data stored on a blockchain is secured by using cryptography.

As used herein, 'AI practitioner(s)' or 'AI model publisher(s)' are individuals or organisations that create, develop, and deploy AI systems or AI solutions for end-users or consumers.

As used herein, 'model validator(s)' are participants in the network who are authorized by a model publisher to validate the efficacy of the model. In a private organization, for example, the model validators may include model-testers, Quality Assurance (QA) Engineers, non-human agents running validation code based on certain rules. In a decentralized public network, the validators are elected based on decentralized voting schemes.

As used herein, 'model benchmark' or 'model score' is a score or value which quantifies the quality of an AI model. For example, prediction performance score of a model when tested against diverse, non-biased and unseen samples. A model benchmark reflects the cumulative effects of network validations over time.

As used herein, 'model store' refers to storage unit(s) or database(s), associated locally or remotely with the computer device, and which is capable to store AI models, user metadata, model scores, incentive tokens, validation metrics, and other data or information necessary in the operation of the decentralized platform according to the embodiments disclosed herein.

As used herein, 'network' refers to a communication network including but not limited to a local area network (LAN), a wide area network (WAN), a metropolitan area network (MAN), a virtual private network (VPN), an enterprise private network (EPN), Internet, and a global area network (GAN).

Terms such as 'connect', 'couple' and other similar terms include a physical connection, a wired connection, a wireless connection, a logical connection, or a combination of such connections including electrical, optical, RF, infrared, Bluetooth, or other transmission media, as may be obvious to a person skilled in the art.

Terms such as 'send', 'transfer', 'transmit' and 'receive', 'collect', 'obtain' and other similar terms refer to transactions of data between various modules and units via wired or wireless connections.

FIG. 1 is a block diagram of a system for providing a decentralized platform configured for deploying at least one AI (Artificial Intelligence) model, according to an exemplary embodiment of the present subject matter. The decentralized platform 108 is in the form of a SaaS (Software-as-a-Service) platform 108 configured in a network to receive and publish AI models. The decentralized platform 108 is communicatively connected to a decentralized model store 116 and may be accessed by authorized model publishers 102, authorized validators 104 and authorised administrators 106.

The decentralized platform 108 includes a SaaS interface configured to publish at least one AI model received from at least one model publisher 102. The SaaS interface is configured as a secure multi-tenant access-controlled SaaS that serves as a one-stop user experience for model publishers 102, testers, validators 104 and public model benchmarks. Further, strong encryption and authentication features are provided to ensure data integrity and access only by authorized individuals regardless of whether the objects associated with the models are accessible or available on public networks. The decentralized platform 108 is communicatively connected to the decentralized model store 116 for storing the at least one AI model. The distributed model store 116 also stores encrypted AI models, test data collected from user interactions and log and usage data. De-centralization of the SaaS platform 108 makes the platform 108 independent of specific providers.

Once the at least one model is received, a model hash value and a Uniform Resource Identifier (URI) are generated for the at least one AI model and stored in the decentralized model store 116. The model hash value is a constituent to a Non Fungible Token (NFT) that uniquely identifies the at least one AI model for posterity immutably. Further, the at least one AI Model is published as NFTs on a public blockchain 112 for mining. In one embodiment of the present subject matter, a distributed compute framework 118 is configured for on-boarding (120a-d) of multiple compute providers (public and private) and edge destinations that are optimally used for deployment of the at least one AI model, based on configured metrics. The SaaS platform 108 is therefore independent of specific providers due to its decentralized feature.

The SaaS interface is further configured to use a decentralized distributed ledger to create a genesis block of the blockchain 112 for the at least one AI model. The genesis block holds the model hash value along with the URI for enabling the plurality of validators 104 to locate and download the at least one AI model from the decentralized model store 116. The SaaS interface thus facilitates in creating a customized distributed ledger or a customized blockchain 112 for AI models and benchmarks potentially layered on and extending public blockchain 112 technology. Model versioning, ongoing benchmarking, contributors, and compute providers are immutably recorded on the blockchain 112 and surfaced via dashboards that are easy to understand from the AI practitioner, AI consumer and administrator 106 point-of view. The genesis block created for the at least one AI model is broadcasted to a plurality of model validators 104 in the network. Each of the plurality of model validators 104 validates the genesis block based on one or more validation metrics and one or more permissible techniques. The one or more prescribed metrics are generated by the plurality of model validators 104 during the validation process. A validated endorsement with respect to the genesis block, from each of the plurality of model validators 104 is received. Further, a check is performed to identify whether or not a consensus is achieved amongst the plurality of validators 104. The blockchain 112 is subsequently updated by adding a new block to the blockchain 112 upon achieving a consensus amongst the plurality of validators 104. The new block includes a model benchmark, the model benchmark producing a score that reflects quality of the consensus achieved. The score is computed on the network once the validations and validation metadata are broadcasted by the validators 104. A cumulative algorithm is used to calculate the score which changes with time to adapt to an increasing number of validators 104 and/or consumers of the models.

The model benchmark is the only assurance that a model consumer has that the model is a performant, is unbiased, is secure, and will scale to global requests.

The updated blockchain 112 is thereafter broadcasted in the network. Before a model is added to the blockchain 112, it is required to achieve consensus from the set of model validators 104. Accordingly, the blockchain 112 remains unchanged if no consensus is achieved. As per the embodiments of the present subject matter, one or more mechanisms or algorithms may be implemented to achieve the consensus. For example, one of the algorithms may include doing m-of-n Byzantine fault tolerance between a set of 'n' model validators 104, where m>n/2. This is a variation of the Proof-of-Authority consensus algorithm. If consensus is reached, then all validators 104 receive network tokens of a value that reflects their contribution to the positive difference in the benchmark (over previous scores) or a flat value if they have just validated the genesis block. The set of 'n' model validators 104 produce one or more metrics for a given AI model. These metrics are generated as a by-product of the validation process which is defined when the genesis block is created. For example, if the network has 'n' number of model validators, then for a newly uploaded model a new genesis block is created and broadcasted to all 'n' validators 104. This will include a list of validation techniques and metrics to be generated once the validation is complete. Consensus is achieved when threshold of minimum number of validators (for example, n/2 validators) have published favourable metrics for the given model. The 'n/2' signifies one dimension in the model benchmark score. Other dimensions include a differential creativity score, etcetera. For example, if all 'n' model validators published favourable metrics for the model then this will result in a higher model benchmark score. The quality of the consensus is higher by being evenly distributed across all model validators. Mathematically, this amounts to overlaying a probability distribution over all available validators 104. A stronger consensus leads to a higher model benchmark score, etcetera.

In the event, the at least one model publisher 102 updates the at least one AI model, the validation step is repeated. The validation step is also repeated if the at least one model publisher 102 updates the at least one AI model. In order to validate the at least one AI model, the plurality of model validators 104, via respective computer devices connected in the network, download the newly published AI model, run validation code, and generate performance metrics, for example, precision, recall and F1 score. A network client maps these performance metrics to a scale and based on certain thresholds, sends a positive or negative endorsement (plus additional information that captures validation specifics) signed by the validators' 104 respective digital signature.

Thus, the plurality of validators 104 collaboratively evaluate the prediction performance of any AI model. This decentralized validation increases baseline model performance, which is a model benchmark that reflects the cumulative effects of network validations over time. This in turn leads to greater confidence amongst consumers. The validation process by the plurality of validators 104 is driven by an incentive mechanism built into the decentralized platform 108 which reimburses the validators 104 with network tokens in proportion to their contribution towards improving the model.

According to an embodiment of the present subject matter, each of the plurality of validators 104 receive a network token of a value if the consensus is reached. The network token is provided as an incentive mechanism. On the public network, the incentive mechanism encourages a game-theoretic approach to competing for both reputation and network tokens which can be exchanged for a fungible cryptocurrency in the future. Any malicious user is to be penalized for broadcasting positive endorsements for a weak model, either through a proof-of-stake system (where validators 104 must initially provide a stake) or through a potentially irreversible reputation hit. Each model validation on the network maps analogously to a bitcoin transaction on the blockchain. The model validators on the network are reimbursed for participating in this distributed validation process. The network credits each validator's wallet with a designated amount of network token once consensus is reached and a new block is added to the blockchain.

According to an embodiment of the present subject matter, the broadcast may be limited to private entities on the network, known peers of the model publisher 102. The former approach allows greater chance of both uptake and test/validation of the model. Coupled with an incentive mechanism tied to a smart-contract that allows a micro-reward to the validator 104 of the AI model, the AI model gradually gets feedback that makes the model publisher 102 fine-tune it appropriately. The micro-rewards to the validator 104 can be waived by the network till the model reaches a certain performance threshold or the smart-contract will chain the price-per-API call for the model to the validation micro-rewards. Micro-rewards loosely map to the notion of tokens on a public network like 'Ethereum' but the intent is only to be a utility within the blockchain 112 network and provide accounting and on-network privileges and not offer value outside the network.

In one embodiment of the present subject matter, one or more independent testers/validators 104 may also register on the network and pick up work to test/validate models. They may use their own authentication keys and their activity may be recorded on the blockchain 112 network for micro-rewards, accounting, and on-network privileges.

The decentralized platform 108 is further configured to provide model auditability, wherein all model operations are registered, published, updated, and predicted in an immutable distributed ledger. It also provides an interface to perform regulatory audit for any given model or across the network. The regulatory audit is performed to identify who used which model and when, what were the results, whether or not the models were used in combination to affect a certain workflow, who validated the models, what were the benchmarks when the results were achieved.

Figure 2:
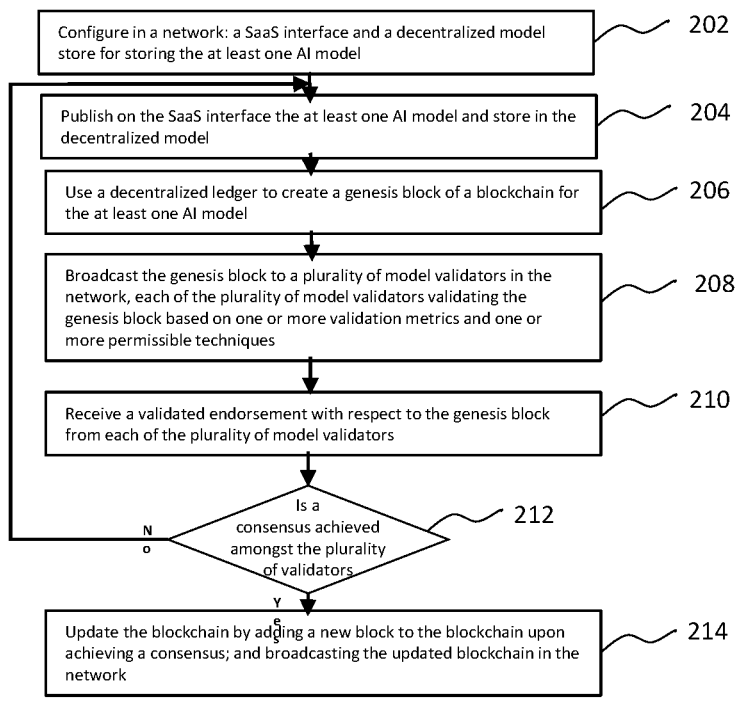
FIG. 2 is a flowchart illustrating validation process according to an exemplary embodiment of the present subject matter.

FIG. 2 is a flowchart illustrating validation process according to an exemplary embodiment of the present subject matter.

At step 202, the decentralized platform 108 is configured to include the SaaS interface for receiving and publishing the at least one AI model. The at least one AI model is stored in the decentralized model store 116.

At step 204, the at least one AI model is published and stored in the decentralized model. The distributed model store 116 also stores encrypted AI models, test data collected from user interactions and log and usage data.

At step 206, a decentralized distributed ledger is used to create a genesis block of a blockchain 112 for the at least one AI model. The genesis block holds the model hash value along with the URI for enabling the plurality of validators 104 to locate and download the at least one AI model from the decentralized model store 116.

At step 208, the genesis block is broadcasted to a plurality of model validators 104 in the network. Each of the plurality of model validators 104 validates the genesis block based on one or more validation metrics and one or more permissible techniques. The one or more prescribed metrics are generated by the plurality of model validators 104 during the validation process.

At step 210, a validated endorsement with respect to the genesis block is received from each of the plurality of model validators 104.

At step 212, a check is performed to identify whether or not a consensus is achieved amongst the plurality of validators 104.

At step 214, the blockchain 112 is subsequently updated by adding a new block to the blockchain 112 upon achieving a consensus amongst the plurality of validators 104. The blockchain 112 is not updated if no consensus is achieved amongst the validators 104. The steps are repeated to revalidate the models.

Figure 3:
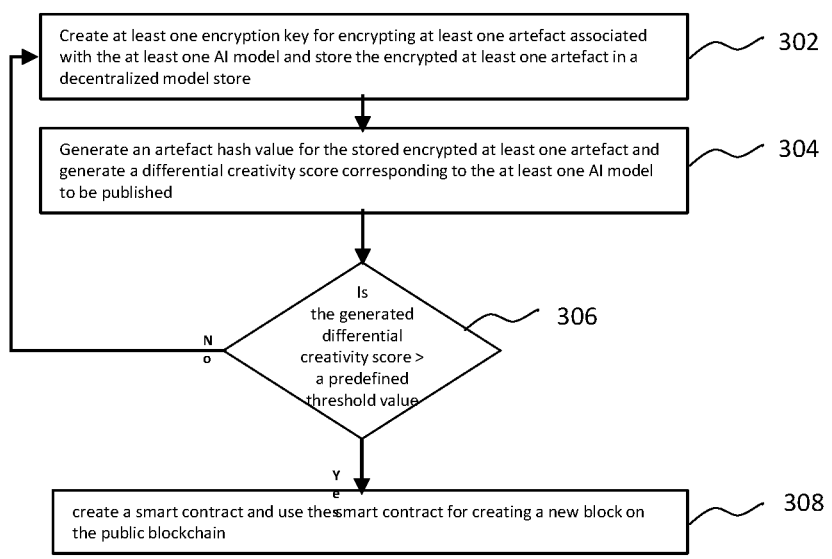
FIG. 3 is a flowchart illustrating steps for publishing a smart contract on a public blockchain, according to an exemplary embodiment of the present subject matter.

FIG. 3 is a flowchart illustrating steps for publishing a smart contract on a public blockchain, according to an exemplary embodiment of the present subject matter. The at least one AI model is published as a Non Fungible Token (NFT) on a public blockchain 112 based on the smart contract.

At step 302, at least one encryption key is created for encrypting at least one artefact associated with the at least one AI model. The encrypted at least one artefact is stored in the decentralized model store 116.

At step 304, an artefact hash value may be generated for the stored encrypted at least one artefact. Subsequently, a differential creativity score is generated that corresponds to the at least one AI model to be published. For each AI model to be published, a corresponding differential score is to be determined. The differential creativity score determines if the model is published or not.

At step 306, the generated differential creativity score is compared with a predefined threshold value. In the event, the differential creativity score is less than the predefined threshold value, a smart contract is created at step 308. The smart contract is further used for creating a new block on the public blockchain 112. The smart contract is not created if the differential creativity score is less than the threshold value.

Further, before publishing the at least one AI model, it is determined if the at least one AI model is different from or similar to an another at least one model already existing in the network. The differential creativity score is computed using a distance metric that measures a custom-distance from the published model and all other models derived from the same lineage or present in the same sub-domain. The differential creativity score is generated by gathering lineage and benchmark information from the at least one AI model to be published, gathering all existing AI models already published, as NFTs on the public blockchain 112, creating a sub-graph of the at least one AI model to be published, creating an embedding for the at least one AI model; and by determining a corresponding custom distance value for the at least one AI model with respect to the already existing AI models, to indicate how close is the at least one AI model to be published is from the existing AI models. The differential creativity score also determines if the at least one AI model qualifies to be published or is to be resent for validation.

The threshold that determines if the differential creativity score is enough to get a model published, ramps up over time. Initially, the user is given more leeway in terms of what constitutes as creativity, with the threshold being lower and the bar lenient. An early leniency directly translates to the value of the token that is generated. A higher differential creativity score produces more value on the network. The initial low threshold allows lower-quality models to be published and allows the user to generate a rank on the network. With each submission the threshold automatically adjusts to make the next submission slightly more difficult. This adjustment is directly proportional to the delta of the token value generated on the latest and the previous submissions. This ensures that the threshold for differential creativity continues to rise for the lifetime of the user, pushing the user to publish higher-quality and starkly differentiated models than before. Thus, each user will have their own creativity threshold that will determine what is publishable. This mechanism may be encoded in a smart-contract, to motivate the user to publish higher-quality work and prevent the network to be flooded by sub-par artefacts. The differential creativity score is determined by analysing one or more factors including type of models and what problems the model is solving, number of derivatives of the parent model on the network, etcetera.

Further, the smart contract is used to mint the artefact hash values as the NFTs, whereas one or more existing model benchmarks is minted as Fungible Token (FTs). The newly minted token is updated with metadata that points to a new URI separately generated to point to the network. In one embodiment herein, a model validation module is configured for encoding model validation and testing guidelines in a smart contract abstraction to incentivize and improve models. The decentralized platform 108 enables the model publishers 102 to enumerate policies, requirement around model validation and testing which will be automatically translated in a smart contract abstraction that will be encoded on customized blockchain 112 and be the primary means for publishers 102, validators 104, testers and consumers to communicate.

Figure 4:
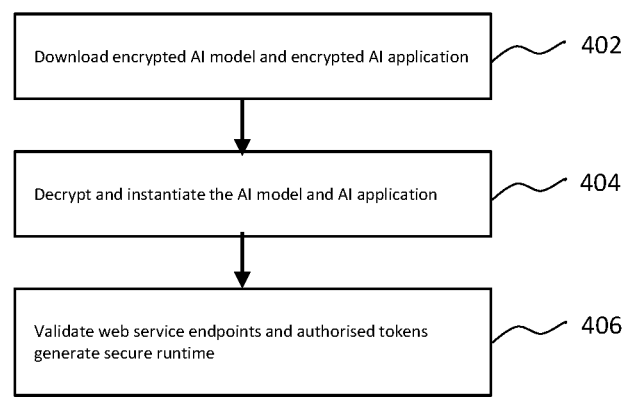
FIG. 4 is a flowchart illustrating secure runtime generation, according to an exemplary embodiment of the present subject matter.

FIG. 4 is a flowchart illustrating secure runtime generation, according to an exemplary embodiment of the present subject matter.

At step 402, the encrypted AI model and encrypted AI application are downloaded to the docker container. According to the embodiments of the present subject matter, there are one or more artefacts associated with the AI model, that need storage, encryption, delivery, decryption, and instantiation. The one or more artefacts include a compressed model binary that may be encrypted with a private key managed by the network and associated with the user who uploaded the model. The one or more artefacts may also include a compressed archive of the model interface i.e., an application that allows a consumer to interact with the model. The compressed archive may be a code, an artwork (for example, png, jpeg, gifs files) and a description of the app runtime (i.e., a Makefile). The model interface is also encrypted with the same private key of the compressed model binary.

At step 404, the encrypted AI model and encrypted AI application are decrypted and instantiated. Upon instantiation of the container, the one or more artefacts are downloaded from a decentralized storage layer, IPFS, and are addressable using the URIs used during container start-up. The one or more artefacts are subsequently decrypted and uncompressed. The decryption key is passed as a parameter to the container instantiation process.

At step 406, web service endpoints and authorised tokens are validated, and secure runtime is generated. A model serving runtime is used to load the model in memory and serve it over the network. The model app is built, if required and then instantiated to establish connection with the in-memory model. Tests are run to ensure that if the app is ready to receive requests and generate appropriate responses (i.e., model predictions). These tests simulate external users connecting to the app and testing the model and uses authentication tokens that are generated in place to prevent unauthorized access.

Figure 5:
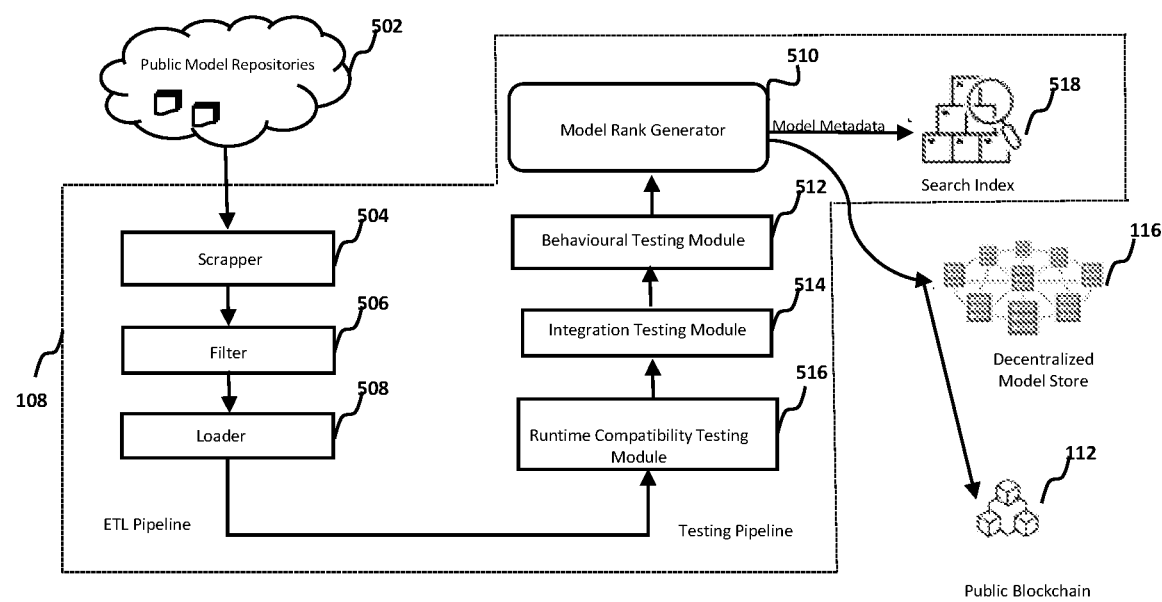
FIG. 5 illustrates working of the decentralized platform according to an exemplary embodiment of the present subject matter.

FIG. 5 illustrates working of the decentralized platform according to an exemplary embodiment of the present subject matter. The one or more AI models are loaded from the public model repositories 502 on the decentralized platform 108. A scraper 504 is configured as a web crawler to search the model repositories 502 for new models and download them. The model repository 502 list is initially static but over time the scraper 504 can piggy-back of a third-party search engine for e.g., Google Search, GitHub search, etc.—to add more model repositories 502 to the list.

A filter 506 is a second-stage process and is configured in the Extract-Transform-Load (ETL) pipeline where models are filtered for compatibility, domain, and ethical reasons. For example, the filter initially filters out all models except the ones generated using the TensorFlow machine learning framework. Similarly, it may filter out all models that do not belong to the Natural Language Processing (NLP) domain. On the ethical side the filter 506 may disable models that generate fake news or images, models used for malicious chatbots' or used in surveillance or warfare. The filter is configurable via a predefined policy.

Further, a loader 508 is configured in the final stage in the ETL pipeline and is an extension to the stage-2 filtration process. It loads the model in memory and sends test samples to make sure the model can generate predictions. Because models can be very large (i.e., multiple gigabytes in size), the loader 508 uses distributed compute to parallelize loading models that pass through the stage-2 filter. Due to the heterogeneous compute requirements for each model, the underlying runtimes may consist of diverse compute architectures, ranging from edge-compatible CPUs to data-center class GPUs. The loader 508 is responsible of building up and tearing down this just-in-time diverse infrastructure. All models which fail the loading process are discarded from the database.

According to the embodiments of the present subject matter, every AI model being uploaded to the network undergoes the auto-testing and validation process. This includes configuring a runtime compatibility testing module 516 for converting the received at least one AI model into an optimized, compressed, mobile friendly, web friendly format that can run on any computer device including cloud-servers, web-browsers, smartphones etcetera. The converted format is then loaded in a custom simulator that validates the model for each of these destination platforms. Incompatible models are discarded.

Figure 6:
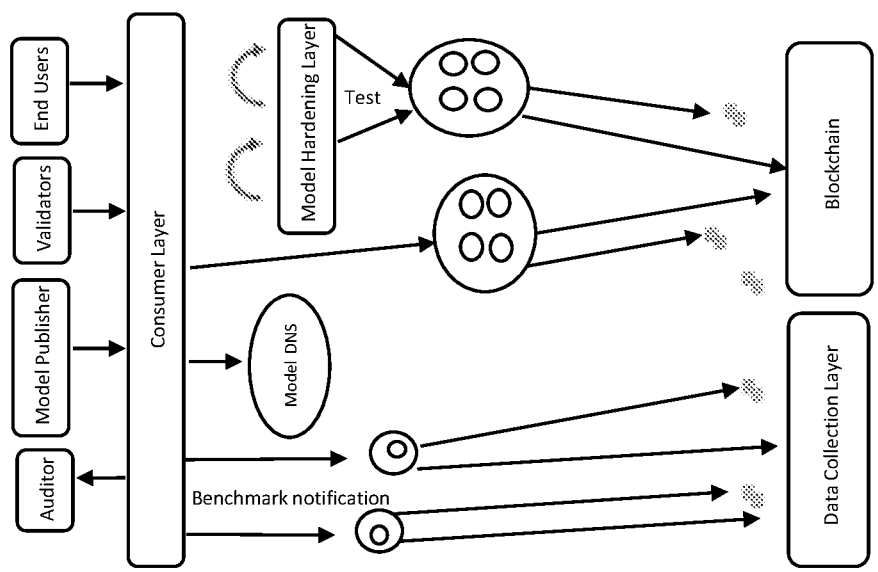
FIG. 6 illustrates inferencing runtime of AI models, according to an exemplary embodiment of the present subject matter.

Further, an integration testing module 514 is configured for testing basic functionality of the model such as testing of request cycles, response cycles. A behavioural testing module 512 is configured for testing robustness of the model to bias when presented with highly biased testing data. Any biased model is discarded or notified by marking with a flag. An adversarial testing module is configured for testing the at least one AI model to identify how secure the model is in the face of adversarial attacks. A model rank generator 510 is configured that allows the users or model publishers to generate rank for the quality models on the network. The at least one AI Model is published as NFTs on a public blockchain 112 for mining FIG. 6 illustrates inferencing runtime of AI models, according to an exemplary embodiment of the present subject matter. FIG. 4 illustrates a secure runtime generation being provided via a docker container that is run in the network within a secure enclave or on a user's private network or home computer device. The encryption keys are automatically supplied if the container runs within the network, else the user is supplied the keys via an off-network mechanism. In one embodiment herein, an auto-detection module is configured for detecting model domains and setting up model pre-processing and hardening pipelines. Model domains refer to data type that is relevant for the model, for example: text, numeric, video, audio etc. Each of these require somewhat bespoke setup to properly consume data and generate the right output. The testing/hardening framework is also specific to the data domain.

In one embodiment herein, a Model feedback framework is configured for collecting usage data of models to do automatic transfer learning at edge locations and feeding results back to the model publisher 102 for potential evaluation and update. The decentralized platform 108 enables the model publishers 102 to leverage localized data collection and perform automated model improvement through transfer learning without data and the improved model leaving the "local" jurisdiction. This is a form of federated learning that does not necessarily improve the global model but improves many local models using local data.

In one embodiment herein, a Model deployment automation module is configured for updating models, AB testing, remote wiping models either user directed or autonomously based on policy encoded as smart contracts. Publishers 102 will use the smart-contract abstraction to encode policy around model deployment events.

In one embodiment herein, a Model DNS 114 is configured for expanding the Domain Name Service (DNS) on the Internet which allows users to find web resources through a distributed translation mechanism. The decentralized platform 108 facilitates the at least one AI model to have a public naming scheme to be found and translated to an API end-point at runtime. Using a de-centralized approach, a mechanism needs to be available for establishing the right endpoint to contact for model/prediction execution. Depending on a user's geo-location, a light-weight intelligent mediation service will translate and in real-time redirect a user to the right potentially local endpoint. This will involve secure authentication and encrypted communication. The datasets used for the validation are generated by the model validators 104 and are required to meet one or more pre-defined criteria before being implemented for validation. These pre-defined criteria include datasets that: are clean of biases, are free of private information, are not align to the distribution of the test dataset in the model artefact (i.e., no overlap with the data that has been used by the model publisher 102); having adversarial samples; and stress-test the model for compute time performance.

The term exemplary is used herein to mean serving as an example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may. Any embodiment or implementation described as exemplary is not necessarily to be construed as preferred or advantageous over other embodiments or implementations. Further, the use of terms such as including, comprising, having, containing and variations thereof, is meant to encompass the items/components/process listed thereafter and equivalents thereof as well as additional items/components/process.

Although the subject matter is described in language specific to structural features and/or acts, it is to be understood that the subject matter defined in the claims is not necessarily limited to the specific features or process as described above. In fact, the specific features and acts described above are disclosed as mere examples of implementing the claims and other equivalent features and processes which are intended to be within the scope of the claims.

What is claimed is:

1. A computer implemented method for providing a decentralized platform for deploying at least one AI (Artificial Intelligence) model, the method comprising:
configuring in a network:
a SaaS interface for publishing the at least one AI model received from at least one model publisher, and
a decentralized model store for storing the at least one AI model;
using a decentralized ledger to create a genesis block of a blockchain for the at least one AI model;
broadcasting the genesis block to a plurality of model validators in the network, each of the plurality of model validators validating the genesis block based on one or more validation metrics and one or more permissible techniques;
receiving, a validated endorsement with respect to the genesis block, from each of the plurality of model validators;
identifying whether or not a consensus is achieved amongst the plurality of validators;
updating the blockchain by adding a new block to the blockchain upon achieving a consensus; and
broadcasting the updated blockchain in the network.

2. The computer implemented method of claim 1, wherein one or more prescribed metrics are generated by the plurality of model validators during the validation process.

3. The computer implemented method of claim 1, wherein the new block includes a model benchmark, the model benchmark producing a score that reflects quality of the consensus achieved.

4. The computer implemented method of claim 1, wherein the blockchain for the at least one model remains unchanged if no consensus is achieved.

5. The computer implemented method of claim 1, wherein the validation step is repeated if the at least one model publisher updates the at least one AI model.

6. The computer implemented method of claim 1, wherein the validation step is repeated if any new model validator revalidates the at least one AI model.

7. The computer implemented method of claim 1, wherein each of the plurality of validators receive a network token of a value if the consensus is reached.

8. The computer implemented method of claim 1, further comprising:
determining, before publishing the at least one AI model, if the at least one AI model is different from or similar to an another at least one model already existing in the network.

9. The computer implemented method of claim 1, wherein a model hash value and a Uniform Resource Identifier (URI) are generated for the at least one AI model stored in the decentralized model store.

10. The computer implemented method of claim 9, wherein the model hash value is a constituent to a Non Fungible Token (NFT) that uniquely identifies the at least one AI model for posterity immutably.

11. The computer implemented method of claim 9, wherein the genesis block holds the model hash value along with the URI for enabling the plurality of validators to locate and download the at least one AI model from the decentralized model store.

12. The computer implemented method of claim 9, wherein the at least one AI Model is published as a Non Fungible Token (NFTs) on a public blockchain for mining.

13. A system for providing a decentralized platform for deploying at least one AI (Artificial Intelligence) model, the system comprising:
a network configured to include:
a SaaS interface configured to publish the at least one AI model received from at least one model publisher, and
a decentralized model storage device configured to store the at least one AI model;
the SaaS interface further configured to:
use a decentralized ledger to create a genesis block of a blockchain for the at least one AI model;
broadcast the genesis block to a plurality of model validators in the network, each of the plurality of model validators validating the genesis block based on one or more validation metrics and one or more permissible techniques;
receive, a validated endorsement with respect to the genesis block, from each of the plurality of model validators;
identify whether or not a consensus is achieved amongst the plurality of validators;
update the blockchain by adding a new block to the blockchain upon achieving a consensus; and
broadcast the updated blockchain in the network.

14. The system of claim 13, wherein the plurality of model validators is configured to generate one or more prescribed metrics during the validation process.

15. The system of claim 13, wherein the new block includes a model benchmark, the model benchmark producing a score that reflects quality of the consensus achieved.

16. The system of claim 13, wherein the blockchain for the at least one AI model remains unchanged if no consensus is achieved.

17. The system of claim 13, wherein the validation is repeated if the at least one AI model publisher updates the at least one model.

18. The system of claim 13, wherein the validation is repeated if any new model validator revalidates the at least one AI model.

19. The system of claim 13, wherein each of the plurality of validators receive a network token of a value if the consensus is reached.

20. The system of claim 13, wherein before publishing the at least one AI model, it is determined if the at least one model is different from or similar to an another at least one model already existing in the network.

21. The system of claim 13, wherein a model hash value and a Uniform Resource Identifier (URI) are generated for the at least one AI model stored in the decentralized model store.

22. The system of claim 21, wherein the model hash value is a constituent to a Non Fungible Token (NFT) that uniquely identifies the at least one model for posterity immutably.

23. The system of claim 21, wherein the genesis block holds the model hash value along with the URI for enabling the plurality of validators to locate and download the at least one model from the decentralized model store.

24. The system of claim 21, wherein the at least one AI Model is published as a Non Fungible Token (NFTs) on a public blockchain for mining.

25. A computer implemented method for publishing at least one AI model as a Non Fungible Token (NFT) on a public blockchain, the method comprising:
creating at least one encryption key for encrypting at least one artefact associated with the at least one AI model;
storing the encrypted at least one artefact in a decentralized model store;
generating an artefact hash value for the stored encrypted at least one artefact;
generating a differential creativity score corresponding to the at least one AI model to be published;
comparing the generated differential creativity score with a predefined threshold value;
creating a smart contract if the differential creativity score is less than the predefined threshold value; and
using the smart contract for creating a new block on the public blockchain.

26. The computer implemented method of claim 25, further comprising:
minting, using the smart contract, the artefact hash values as the NFTs, and
minting, using the smart contract, one or more existing model benchmarks as Fungible Token (FTs);
wherein a newly minted token is updated with metadata that points to a new URI separately generated to point to the network.

27. The computer implemented method of claim 25, wherein the differential creativity score is used to determine, before publishing the at least one model, if the at least one model is different from or similar to an another at least one model already existing on the public blockchain.

28. The computer implemented method of claim 25, wherein the differential creativity score is generated by:
gathering lineage and benchmark information from the at least one AI model to be published;
gathering all existing AI models already published, as NFTs on the public blockchain;
creating a sub-graph of the at least one AI model to be published;
creating an embedding for the at least one AI model; and
determining a corresponding custom distance value for the at least one AI model with respect to the already existing AI models, to indicate how close is the at least one AI model to be published is from the existing AI models.

29. The computer implemented method of claim 25, wherein the differential creativity score determines if the at least one AI model has to be published or is to be resent for validation.

30. The computer implemented method of claim 25, further comprising:
configuring in the network:
a runtime compatibility testing module for converting the at least one AI model to a compatible format that can be run on one or more devices;

an integration testing module for testing basic functionality of the at least one AI model;

a behavioural testing module for testing robustness of the at least one AI model; and an adversarial testing module for testing security of the at least model against any adversarial attacks.

31. The computer implemented method of claim 25, further comprising providing a secure runtime generation by configuring a docker container in the network.

32. A system for publishing at least one AI (Artificial Intelligence) model as a Non Fungible Token (NFT) on a public blockchain, the system comprising:

a network configured to include:

a SaaS interface configured to publish the at least one AI model received from at least one model publisher, and a decentralized model storage device configured to store the at least one AI model;

the SaaS interface further configured to:

create at least one encryption key for encrypting at least one artefact associated with the at least one AI model;

store the encrypted at least one artefact in the decentralized model storage device;

generate an artefact hash value for the stored encrypted at least one artefact;

generate a differential creativity score corresponding to the at least one AI model to be published;

compare the generated differential creativity score with a predefined threshold value;

create a smart contract if the differential creativity score is less than the predefined threshold value; and use the smart contract for creating a new block on the public blockchain.

33. The system of claim 32, further configured to:

mint, using the smart contract, the artefact hash values as NFTs, and mint, using the smart contract, one or more existing model benchmarks as Fungible Tokens (FTs);

wherein a newly minted token is updated with metadata that points to a new URI separately generated to point to the network.

34. The system of claim 32, wherein the differential creativity score is used to determine, before publishing the at least one model, if the at least one model is different from or similar to an another at least one model already existing on the public blockchain.

35. The system of claim 32, wherein the differential creativity score is generated by:

gathering lineage and benchmark information from the at least one AI model to be published;

gathering all existing AI models already published, as NFTs on the public blockchain;

creating a sub-graph of the at least one AI model to be published;

creating an embedding for the at least one AI model; and determining a corresponding custom distance value for the at least one AI model with respect to the already existing AI models, to indicate how close is the at least one AI model to be published is from the existing AI models.

36. The system of claim 32, wherein the differential creativity score determines if the at least one AI model has to be published or is to be resent for validation.

37. The system of claim 32, further comprising:

configured in the network:

a runtime compatibility testing module for converting the at least one AI model to a compatible format that can be run on one or more devices;

an integration testing module for testing basic functionality of the at least one AI model;

a behavioural testing module for testing robustness of the at least one AI model; and an adversarial testing module for testing security of the at least model against any adversarial attacks.

38. The system of claim 32, wherein a docker container is configured in the network for providing a secure runtime generation.

\* \* \* \* \*